United States Patent [19]

Sekido et al.

[11] 4,363,079

[45] Dec. 7, 1982

[54] SOLID STATE DOUBLE LAYER CAPACITOR

[75] Inventors: Satoshi Sekido, Yawata; Yoshito Ninomiya, Hirakata, both of Japan

[73] Assignee: Matsushita Electric Industrial Co., Ltd., Kadoma, Japan

[21] Appl. No.: 276,693

[22] Filed: Jun. 23, 1981

Related U.S. Application Data

[63] Continuation of Ser. No. 105,855, Dec. 20, 1979, abandoned.

[30] Foreign Application Priority Data

Dec. 29, 1978 [JP] Japan .................................. 53-165706
Apr. 5, 1979 [JP] Japan .................................. 54-41382
May 25, 1979 [JP] Japan .................................. 54-65366

[51] Int. Cl.³ .......................... H01G 9/00; B01J 17/00
[52] U.S. Cl. .................................. 361/433; 252/62.2; 29/570
[58] Field of Search ....................... 361/272, 273, 433; 29/570; 252/62.2

[56] References Cited

U.S. PATENT DOCUMENTS

| | | | |
|---|---|---|---|
| 3,855,506 | 12/1974 | Halasz et al. | 361/433 |
| 4,041,359 | 8/1977 | Mizushima et al. | 361/433 |
| 4,110,815 | 8/1978 | Frade et al. | 361/433 |
| 4,117,531 | 9/1978 | Ross et al. | 252/62.2 |
| 4,161,013 | 7/1979 | Grodzinsky | 361/433 |
| 4,164,004 | 8/1979 | Saito | 361/433 |
| 4,184,192 | 1/1980 | Yoshida | 361/433 |
| 4,186,423 | 1/1980 | Yoshida | 361/433 |
| 4,245,278 | 1/1981 | Finkelstein | 361/433 |

*Primary Examiner*—Andrew J. James
*Attorney, Agent, or Firm*—Cushman, Darby & Cushman

[57] ABSTRACT

A solid state double layer capacitor comprising at least a polarization electrode and a counter electrode comprising cuprous sulfide and a solid electrolyte, and being superior in potential linearity of the polarization electrode with respect to a supplied charge amount and also in charge storage capability.

18 Claims, 20 Drawing Figures

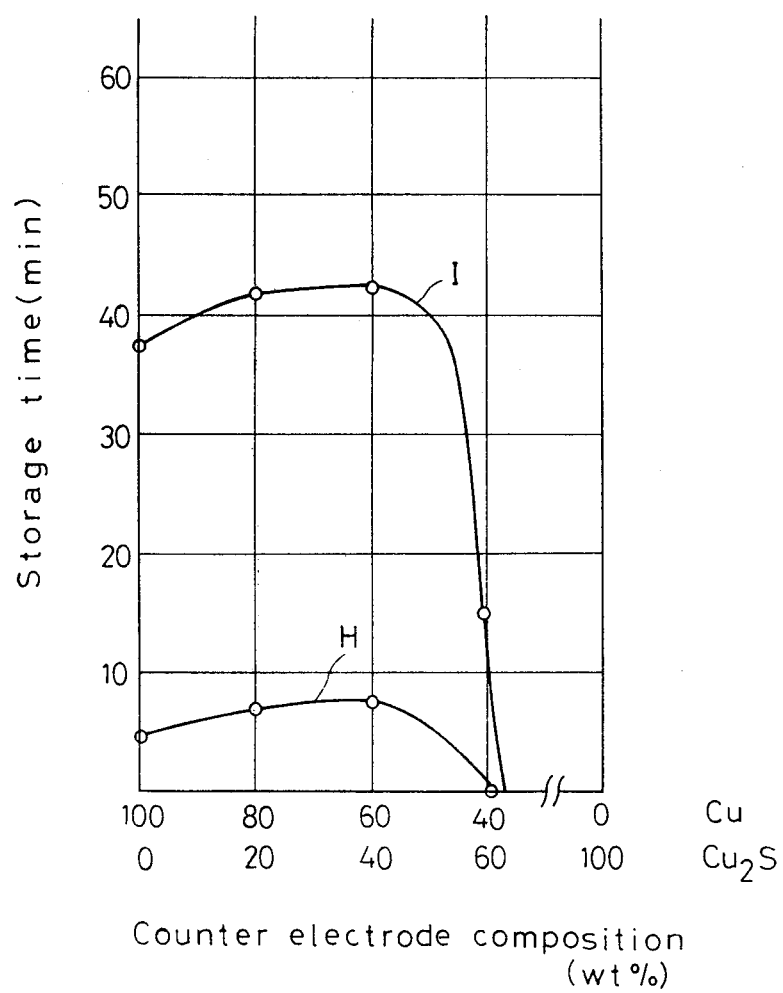
F I G. 10

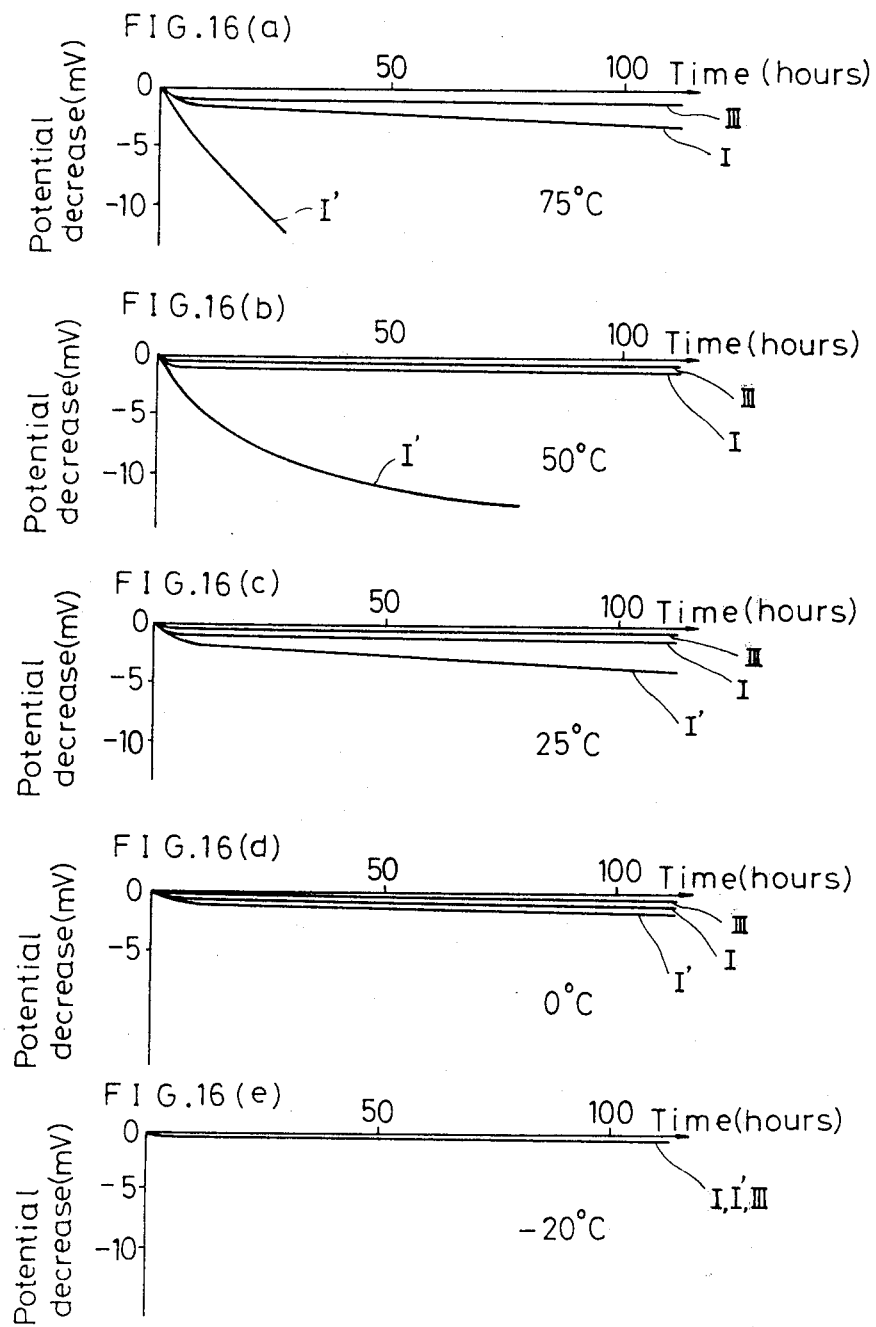

SOLID STATE DOUBLE LAYER CAPACITOR

This is a continuation of application Ser. No. 105,855 filed Dec. 20, 1979, now abandoned.

BACKGROUND OF THE INVENTION

1. Field of the Invention

The present invention relates to a capacitive device utilizing an electric double layer and containing a solid electrolyte therein.

2. Description of the Prior Art

Carbon or silver chalcogenide such as $Ag_2Se$-$Ag_3PO_4$ has been employed as a polarizable electrode in conventional solid state capacitors utilizing electric double layers formed at an interface between a polarization electrode and a solid electrolyte. Non-polarizable Ag has been employed as a counter electrode, and a solid electrolyte of Ag ionic conductivity such as $RbAg_4I_5$, $NR_4Ag_4I_5$, $Ag_3SI$ and $Ag_6I_4WO_4$ as the solid electrolyte, respectively. The solid state capacitor of such a type has an advantage that its capacity is large in comparison with a solid state device using a space charge effect, a capacitive device using a dielectric, or an IC device where charges at the semiconductor surface are used for capacitive elements. However, such conventional solid state capacitors have a shortcoming that they are very expensive owing to expensive materials such as silver and silver salt.

The present inventors have developed capacitive devices wherein a molded compound obtained by mixing $Cu_xS(x \leq 2)$ and a solid electrolyte was employed for a polarizable electrode, a counter electrode and a reference electrode, and the devices are filled with a solid electrolyte of $Cu^+$ ionic conductivity produced from a reactant of cuprous halide and N-methylhexamethylenetetramine halide or N,N'-methyl-triethylenediamine halide. Such capacitive devices were devised for the sake of cost reduction by employing $Cu_2S$ and the solid electrolyte of $Cu^+$ ionic conductivity without using Ag as a counter electrode material. They are free from breakdown at an early stage liable to take place in a capacitive device where Ag as the counter electrode material is simply replaced with Cu. However, the capacitive devices have turned out to be not satisfactory, since they have the following shortcomings. At room temperature the solid electrolyte shows low ionic conductivity of $10^{-2}$ʊ/cm which is 1/5 to 1/10 of the ionic conductivity of a silver salt, thus only small quantity of current can flow comparing to the silver salt. Further, cuprous halide is again deposited in the solid electrolyte and thus a leak current flows through the deposited compound (in other words, ionic conduction does not play a primal role at this stage). Accordingly, charge storage capability is worse than that of the conventional capacitive devices containing silver salt.

SUMMARY OF THE INVENTION

The present invention provides capacitive devices which comprise a polarization electrode and a counter electrode comprising cuprous sulfide and a solid electrolyte, and which are superior in a potential linearity of the polarization electrode with respect to a supplied charge amount and in charge storage capability at a current termination.

BRIEF DESCRIPTION OF THE DRAWINGS

FIG. 10 is a graph showing relationships between a composition rate of a counter electrode and charge storage capability (storage time) with a discharge current of 30 μA in a capacitive device of the present invention.

FIG. 16(a) to FIG. 16(e) are graphs to compare charge storage capability of the capacitive device of FIG. 3 with other capacitive devices produced by products of the prior arts.

DESCRIPTION OF THE PREFERRED EMBODIMENTS

The present invention provides a solid state double layer capacitor comprising a polarization electrode, a counter electrode, a solid electrolyte disposed between said polarization electrode and said counter electrode, said polarization electrode and said counter electrode comprising cuprous sulfide, and said solid electrolyte being characterized in that said solid electrolyte comprises CuCl substituted 1/5 of $Cu^+$ ions with $Rb^+$ ions and $\frac{1}{4}$ to $\frac{1}{3}$ of $Cl^-$ ions with $I^-$ ions in CuCl.

Recently, it is reported at the 6th Solid Electrolyte Meeting (sponsored by Japan Chemical Society and held in Tokyo on Oct. 19–20, 1978) that $Rb_4Cu_{16}I_7Cl_{13}$ shows $Cu^+$ ionic conductive of high conductivity about the same order of that of $RbAg_4I_5$. Following this report, the present inventors studied the solid electrolyte of similar composition and found that the conventional problems in the charge storage capability degradation at a temperature above 45° C. due to electric-conductive $Cu_x$ deposition can nearly be overcome by substituting 1/5 of $Cu^+$ ion in CuCl with $Rb^+$ ion and $\frac{1}{3}$ to 7/20 of $Cl^-$ ion in CuCl with $I^-$ ion, respectively. The present inventors further proceeded with their research and found that a solid electrolyte prepared by the abovementioned composition contains a small amount of CuI therein and that a solid electrolyte prepared by substituting 1/5 of $Cu^+$ ion in CuCl with $Rb^+$ ion and an amount slightly smaller than $\frac{1}{3}$ of $Cl^-$ ion in CuCl with $I^-$ ion, respectively, is superior in the charge storage capability.

The present inventors found that superior capability of the charge storage is obtainable with a solid electrolyte prepared by substituting 1/5 of $Cu^+$ ion in CuCl with $Rb^+$ ion and $\frac{1}{3}$ to $\frac{1}{4}$ of $Cl^-$ ion in CuCl with $I^-$ ion, respectively. The solid electrolyte in accordance with the present invention turned out to be superior in stability and ionic conductivity than those of a product obtained by a reaction between CuBr and N,N'-methyltriethylenediaminebromide, which reactant has been conventionally known to have a high $Cu^+$ ionic conductivity.

Figure 1:
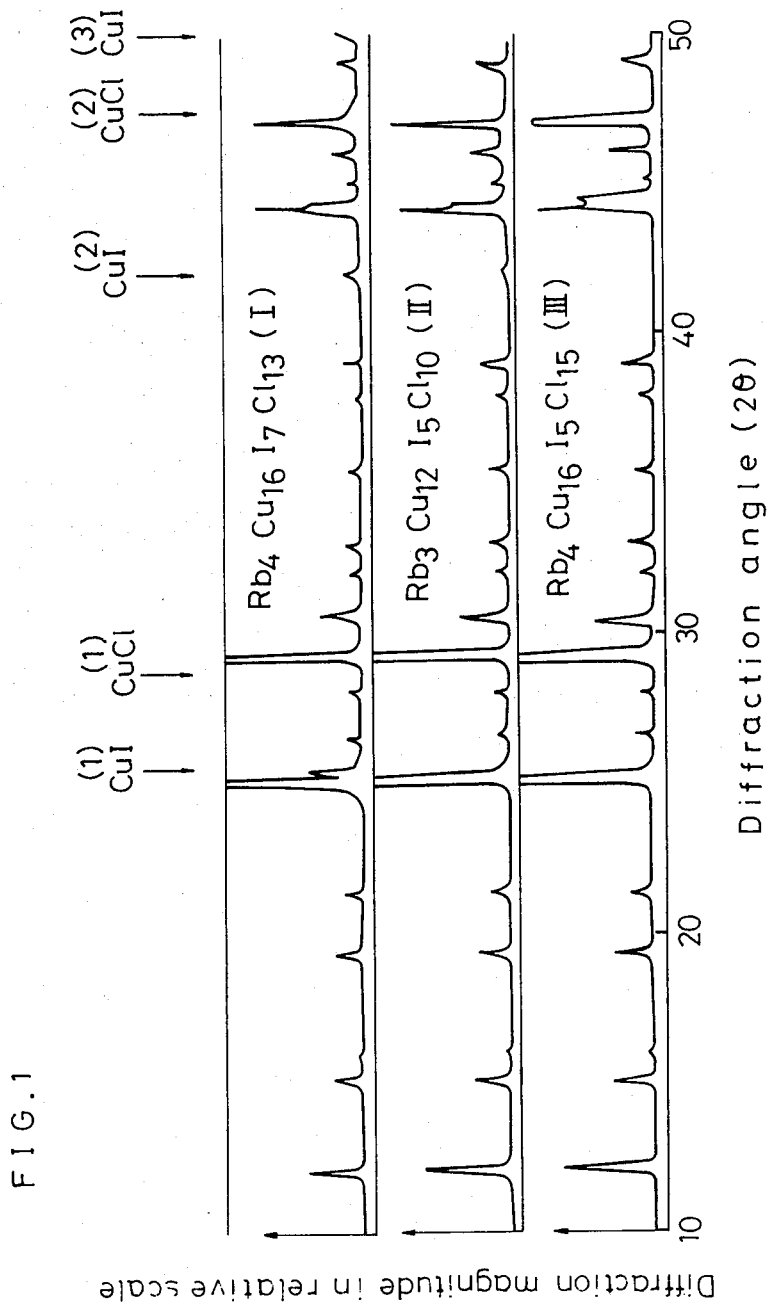
FIG. 1 is X-ray diffraction patterns to indicate existence of CuI in solid electrolytes of different composition.

FIG. 1 is X-ray diffraction patterns from which we can examine whether CuI is contained in solid electrolytes of three different composition. The three solid electrolytes are $Rb_4Cu_{16}I_7Cl_{13}$ (designated by a solid electrolyte I) reported at the 6th Solid Electrolyte Meeting, and $Rb_3Cu_{12}I_5Cl_{10}$ (designated by a solid electrolyte II) and $Rb_4Cu_{16}I_5Cl_{15}$ (designated by a solid electrolyte III) in accordance with the present invention. The reported solid electrolyte I, $Rb_4Cu_{16}I_7Cl_{13}$ contains a relatively large amount of CuI therein (this is confirmed from peaks in the X-ray diffraction pattern at $2\theta = 25.5°$ and 42.2°, where $\theta$ is an incidence angle with respect to a crystal face). On the other hand, the solid electrolyte II of the present invention, $Rb_3Cu_{12}I_5Cl_{10}$ prepared by substituting $\frac{1}{3}$ of $Cl^-$ ion in CuCl with $I^-$ ion contains only a small amount of CuI therein. It is confirmed from the X-ray diffraction pattern that no CuI at all is contained in the solid electrolyte III of the present invention, $Rb_4Cu_{16}I_5Cl_{15}$ prepared by substituting $\frac{1}{4}$ of $Cl^-$ ion in CuCl with $I^-$ ion.

Figure 2:
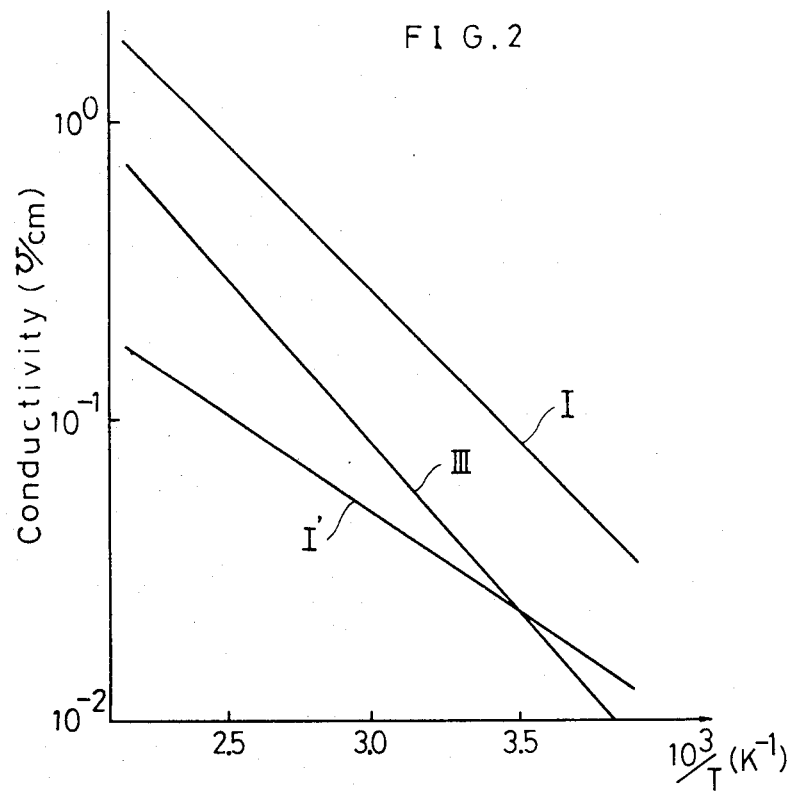
FIG. 2 is a graph showing conductivity with respect to a temperature of conventional solid electrolytes and a solid electrolyte of the present invention.

FIG. 2 is a graph showing conductivity of the conventional solid electrolytes and a solid electrolyte III, $Rb_4Cu_{16}I_5Cl_{15}$ of the present invention with respect to a temperature. The recently reported solid electrolyte I, $Rb_4Cu_{16}I_7Cl_{13}$ has a temperature dependency in a conductivity variation as shown by a curve designated by I. The solid electrolyte III, $Rb_4Cu_{16}I_5Cl_{15}$ of the present invention shows a conductivity variation shown by a curve designated by III. A curve designated by I' shows a conductivity variation of the conventional reactant prepared from CuBr and methyltriethylenediaminebromide. It is seen from the curves I, I' and III that the solid electrolyte III, $Rb_4Cu_{16}I_5Cl_{15}$ of the present invention is inferior in conductivity to the reported solid electrolyte I, $Rb_4Cl_{16}I_7Cl_{13}$, but is better than the conventional solid electrolyte I' at a temperature above 12.7° C.

The present invention provides a charge storage capacitor comprising electrodes containing the abovementioned solid electrolyte therein. Embodiments of the present invention are hereinafter elucidated by referring to FIG. 3 to FIG. 16.

Figure 3:
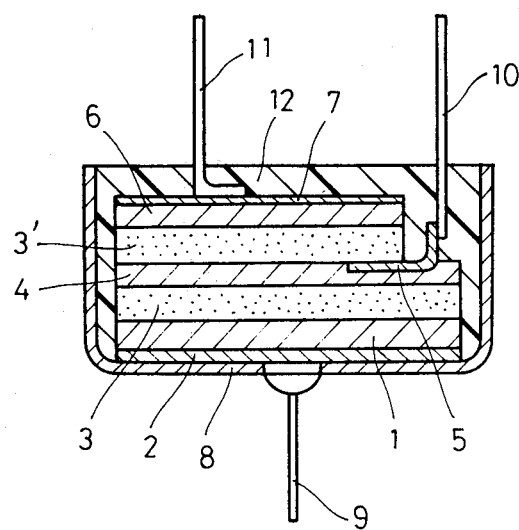
FIG. 3 is a sectional elevational view of a capacitive device in accordance with a first embodiment of the present invention.

FIG. 3 is a sectional elevation view of a capacitive device in accordance with a first embodiment of the present invention. The capacitive device of the first embodiment comprises a counter electrode 1, a current collector 2 for the counter electrode 1, a first solid electrolyte layer 3, a polarizable electrode 4 confronting the counter electrode 1 through the first solid electrolyte layer 3, a current collector 5 for the polarizable electrode 4, a reference electrode 6 confronting the polarizable electrode 4 through a second solid electrolyte layer 3', a current collector 7 for the reference electrode 6, and a metal casing 8.

The capacitive device is formed as follows: The solid electrolyte III, $Rb_4Cu_{16}I_5Cl_{15}$ and $Cu_xS$ are mixed up to result in about 80 wt % of $Cu_xS$ in the resultant mixture, and then the mixture is molded to form the counter electrode 1. The current collector 2 for the counter electrode 1 is formed thereon by evaporating an inert metal such as Au, Pd or Pt.

Alternatively, a metal net plate by Au, Pd or Pt can be used as the current collector 2 of the counter electrode 1. The plated metal net is buried in the counter electrode 1 with pressure at the same time of the compression molding of the counter electrode 1. As constituents for the solid electrolyte layer 3, cuprous halide and rubidium halide are heated at 140° C. for 2 hours to drive away water and halogen excess therefrom and then mixed to result in $Rb_2Cu_8I_3Cl_7$. $Rb_2Cu_8I_3Cl_7$ is further molded in a molded pellet and heated at 200° C. for 17 hours to obtain the solid electrolyte layer 3. The polarization electrode 4 and the current collector 5 thereof are respectively formed in a similar manner to the case of the counter electrode 1 and the current collector 2 thereof.

The reference electrode 6 and the current collector 7 thereof are also respectively formed in a similar manner to the case of the counter electrode 1 and the current collector 2 thereof. The second solid electrolyte layer 3' is formed between the polarization electrode 4 and the reference electrode 6 in a similar manner to the case of the first solid electrolyte layer 3.

The current collector 2 is disposed at and connected to a bottom face of the metal casing 8. The current collector 2, the counter electrode 1, the first solid electrolyte layer 3, the polarization electrode 4, the second solid electrolyte layer 3', the reference electrode 6 and the current collector 7 thereof are stacked in the metal casing 8. A lead wire 9 is connected to the metal casing 8. A lead wire 10 is connected to the current collector 5 of the polarization electrode 4. A lead wire 11 is connected to the current collector 7 of the reference electrode 6. The lead wires 10 and 11 around the connection places are buried by using an insulation resin 12 such as epoxy resin as a packing material.

A copper wire plated by an inert metal for example, Au, Pd or Pt is pressed in the polarization electrode 4 at the compression molding of the polarization electrode 4 to form the current collector 5. A portion of the current collector 5 is turned up from the polarization electrode 4 after cutting off the portions of the second solid electrolyte layer 3', the reference electrode 6 and the current collector 7 thereof. This is made at a stage after the compression molding of the stacked capacitive device elements, and an evaporation of the current collectors 2 and 7 are completed. The lead wire 10 is soldered to the current collector 5 as shown in FIG. 3.

Figure 4:
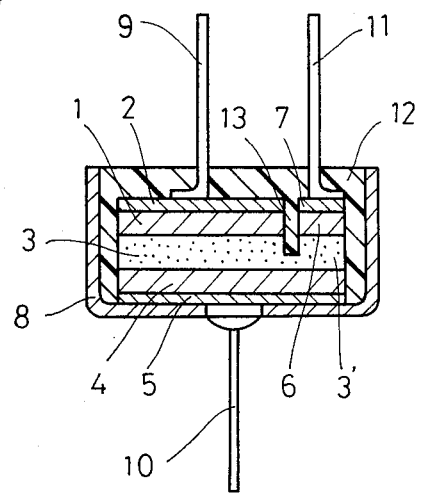
FIG. 4 is a sectional elevational view of another capacitive device in accordance with a second embodiment of the present invention.
Figure 5:
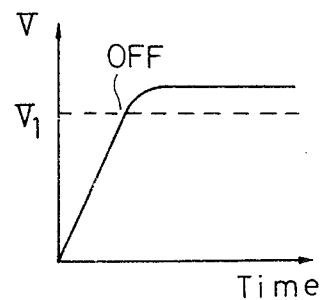
FIG. 5 is a graph showing a characteristic curve of charge storage capacity of the capacitive device of FIG. 4.

The reference electrode 6 is disposed in a manner that it confronts the counter electrode 1 in the first embodiment of FIG. 3. A second embodiment as a modified embodiment is shown in FIG. 4. A brim portion of a disk-shaped counter electrode 1 is separated from the rest by a groove 13, and is used as a reference electrode 6. A capactive device in accordance with the second embodiment has a shortcoming in comparison with the capacitive device of the first embodiment in that potential of the polarization electrode 4 overshoots a predetermined potential level $V_1$ as shown in FIG. 5 when current supply is terminated. It is assumed that this is because the charge distribution of the polarization electrode 4 confronting the reference electrode 6 changes even after the termination of the current supply. This is because that current seemingly flows only near the counter electrode 1, and the charge distribution under the reference electrode 6, where no current flows, is different from that of the counter electrode 1. Therefore the carrier distribution in the capacitive device changes, resulting in a uniform distribution after the termination of the current supply. Similar overshoot phenomenon is also observed when current again begins to flow. However, the capacitive device of the second embodiment shown in FIG. 4 has distinctive advantageous features that the device element needs less material and that it can be produced with fewer production steps in comparison with the capacitive device of the first embodiment.

Figure 6:
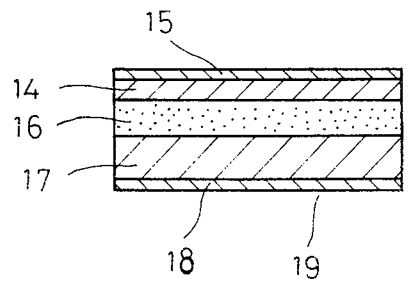
FIG. 6 is a sectional elevational view of still another capacitive device in accordance with a third embodiment of the present invention.

A capacitive device element 19 in accordance with a third embodiment is shown in FIG. 6. The capacitive device element 19 comprises a counter electrode 14 used as a negative electrode, a current collector 15 thereof, a solid electrolyte layer 16, a polarization electrode 17 used as a positive electrode, and a current collector 18 thereof. Electrolytic copper powder (preferably above 4 nines purity) is added by 60 wt % to $Cu_xS$. 80 wt % of said mixture containing 60 wt % of electrolytic copper powder and 40 wt % of $Cu_xS$ and 20 wt % of a solid electrolyte with the composition disclosed by the present inventors in the instant application are mixed up and molded to obtain a pressed pellet for the counter electrode 14. The current collector 15 of the counter electrode 14 is formed by evaporating an inert metal such as Au, Pd or Pt on the counter electrode 14. The solid electrolyte layer 16 is prepared in a similar manner to the case of the first solid electrolytic layer 3 of the first embodiment.

1 weight part of active carbon and 9 weight parts of the solid electrolyte are mixed together and the mixture is molded to obtain a pressed pellet for the polarization electrode 17. The current collector 18 of the polarization electrode 17 is similarly formed on the polarization electrode 17 by evaporating an inert metal like the case of the current collector 15.

Figure 7:
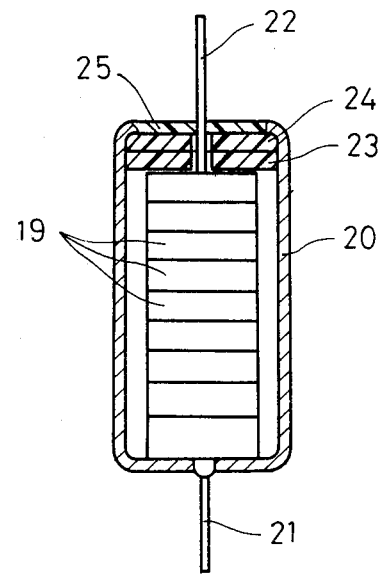
FIG. 7 is a sectional elevational view schematically showing a practical capacitive device comprising several capacitive device unit cells in accordance with the present invention.

The capacitive device element of FIG. 6 constitutes a component unit cell of a practical capacitor, which has a predetermined number of such unit cells. Breakdown voltage of the capacitive device element in accordance with the third embodiment corresponds to a decomposition voltage of 0.6 V. Higher breakdown voltage is obtainable by connecting several unit cells in series. FIG. 7 is a sectional elevational view schematically showing a practical capacitive device comprising several capacitive device unit cells in accordance with the third embodiment of the present invention.

The capacitive device of FIG. 7 comprises several capacitive device unit cells 19 in a metal casing 20. The capacitive device elements 19 are adhered with each other by use of silver paste and disposed in the metal casing 20. A lead wire 21 is connected with the metal casing 20 by welding, soldering or brazing. A lead wire 22 is similarly connected with a current collector 18 of a capacitive device unit cell at one end of the stacking unit cells 19. A packing rubber 23 and a cap 24 of resin are inserted at an opening part of the metal casing 20. After the insertion, the opening part of the metal casing 20 is curled inwards so as to press the stacking unit cells 19 against the bottom face of the metal casing 20. A resin 25 is used on the cap 24 as a bulking agent.

Figure 8:
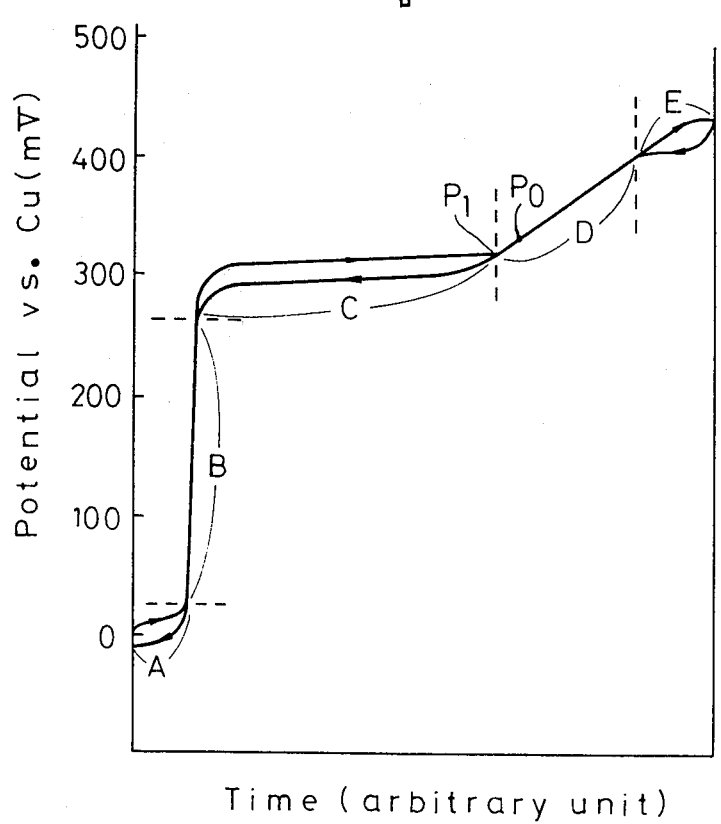
FIG. 8 is a graph showing potential variations of a polarization electrode and a counter electrode with respect to a reference electrode of Cu in a capacitive device in accordance with the present invention.

FIG. 8 is a graph showing potential variations of a polarization electrode and a counter electrode both comprising $Cu_xS$ with respect to a potential of a reference electrode comprising Cu powder. The graph is obtained with a constant DC current in a capacitive device in accordance with the present invention. Cu powder and an excess amount of sulfur powder are mixed together and heated in a closed capsule so as to react with each other, suppressing vaporization of S. The reactant is then heated at 150° C. for 15 hours in the air in order to remove the excess amount of sulfur thereby to make the resulting reactant become $Cu_xS$ with x of about 1.63 $Cu_xS$ ($x \simeq 1.63$) and a solid electrolyte with the composition proposed by the present inventors are mixed in a ratio of 8 parts by weight of the former and 2 parts by weight of the latter, and the mixture is molded to obtain pressed pellets for a polarization electrode and a counter electrode of the capacitive device shown in FIG. 3 or FIG. 4. Electrolytic copper and similar solid electrolyte are mixed together in a ratio of 8 parts by weight of the former and 2 parts by weight of the latter to obtain a mixture for a reference electrode. The weight of the counter electrode is one half of that of the polarization electrode and the reference electrode.

At the time before a current flows in the capacitive device, initial potentials of the polarization electrode and the counter electrode with respect to the reference electrode are about 330 mV at a point $P_0$. A voltage is applied to the capacitive device by using the polarization electrode as an anode and the counter electrode as a cathode, and the current flow is adjusted so as to obtain a current density of 1 mA/cm².

(a-1): The potential of the polarization electrode linearly rises as shown by a curve in a section designated by D, while the potential of the counter electrode changes leftwards from the point $P_0$ (at 330 mV) as shown by a curve in a section designated by C. When the current supply is stopped in the section D, the potential of the polarization electrode does not change, but in this stage the potential of the counter electrode rises and stops at a voltage of about 310 mV (at a point designated by $P_1$).

(a-2): When the current supply further continues, the potential of the polarization electrode reaches a flat portion at about 430 mV in a region designated by E, while the potential of the counter electrode lies in the region C. When the current supply is stopped at this stage, the potential of the polarization electrode becomes about 410 mV, while that of the counter electrode becomes to about 310 mV. At this stage the amount of Cu slightly increases than the case of (a-1).

(a-3): When the current supply further proceeds, the potential of the polarization electrode lies in the region E, while that of the counter electrode drastically decreases in a region designated by B and goes into a low potential region designated by A. When the current supply is stopped at this stage, the potential of the polarization electrode converges to around 415 mV, while that of the counter electrode converges to around 0 mV.

(b-1): When the current supply is made reversely, i.e. by using the polarization electrode as a cathode and the counter electrode as an anode, the overall reaction takes place completely in a reversible manner. In these regions the $Cu_xS$ of the counter electrode has two phases in place of the homogeneous phase, and hence the counter electrode is not polarizable resulting in making hysteresis loops in the regions A and C in the potential curve.

After studying the potential curve, we can conclude that a capacitive device comprising a polarization electrode comprising $Cu_xS$ with $x=1.63$ (this is the case when the potential is in the region D of the curve) has a superior linearity in potential variations responding to the current supply amount all over the potential variations of the polarization electrode from 0 to 70 mV with respect to the reference electrode. In addition, it has superior charge storage capability at a time of a current supply termination. We also conclude that the potential of the counter electrode comprising $Cu_{1.63}S$ little varies over the wide variation range of the supplying charge amount in the region C and that it is therefore possible to set a voltage impressed across the counter electrode and the polarization electrode at a low level.

It is particularly preferable that the reference electrode comprises $Cu_xS$ with $x=1.63$. The reason is that the potential variation range for the potential linearity of the polarization electrode becomes narrower if the reference electrode comprises $Cu_xS$ with $x<1.63$ and that the charge storage capability and the lineality of the polarization electrode potential around 0 V with respect to the reference electrode become worse if the reference electrode comprises $Cu_xS$ with $x<1.63$.

However, it is not easy to prepare and control the composition of $Cu_xS$ for $x=1.63$ in precise. Generally speaking, $Cu_xS$, which is heated at 150° C. in the air for more than 15 hours so as to drive away the excess amount of sulfur, has x smaller than 1.63. It is preferable to control the composition of the reference electrode by a coulomb titration. First, the weight of the counter electrode is set to be about twice of that of the polarization electrode, and the reference electrode is used to work as a polarization electrode (working electrode). And a current is fed to flow between the counter electrode and the reference electrode used as a cathode. The coulomb titration is made by observing the potential of the reference electrode with respect to that of the polarization electrode and the titration is stopped when the reference electrode potential deflects from the straight line in the region D.

In case that $Cu_xS$ with $x=1.63$ is employed for the counter electrode of the capacitive device element shown in FIG. 6, it is necessary to decrease the counter electrode potential to the Cu potential. This is because the counter electrode potential with respect to the reference electrode (i.e. vs. Cu) varies around the potential of about 310 mV, and therefore breakdown voltage of 0.6 V corresponding to the decomposition voltage of the solid electrolyte can not be expected. Following the abovementioned analysis of the curves of FIG. 8, a relation between a rest potential and an amount of the added copper powder is measured. Measurement results are shown in FIG. 9 and FIG. 10.

Figure 9:
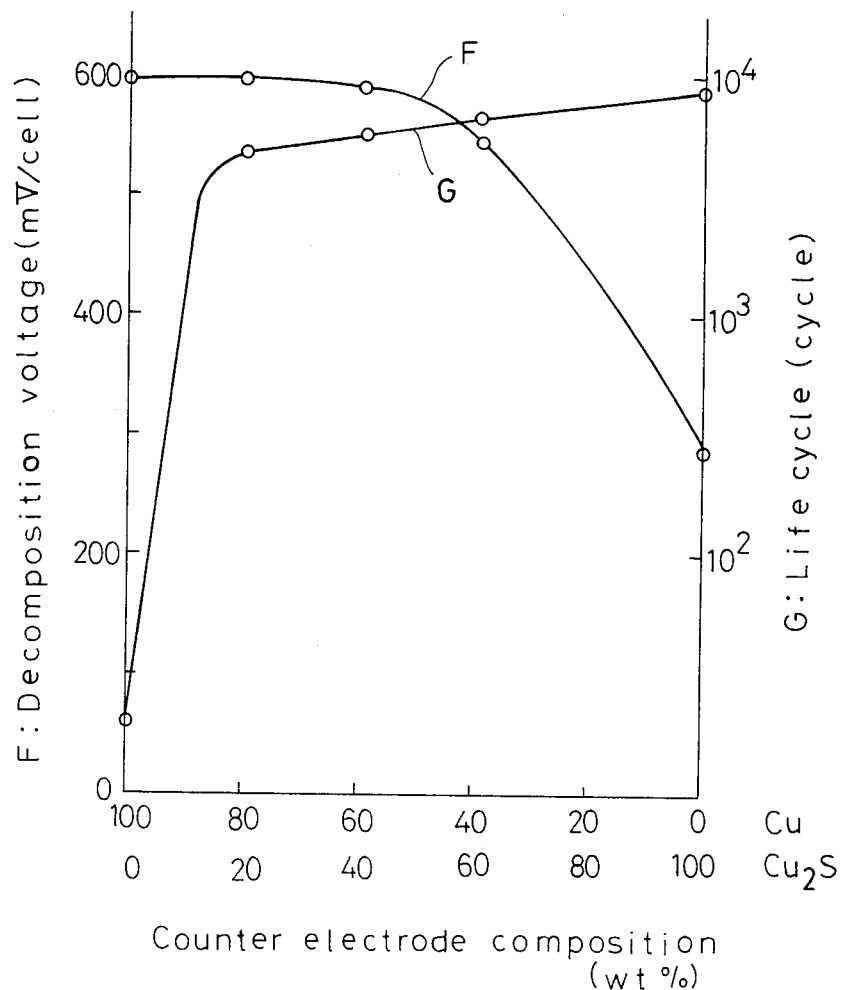
FIG. 9 is a graph showing relationships between a composition rate of a counter electrode and decomposition voltage and life cycle in a capacitive device of the present invention.

FIG. 9 is a graph showing relationships between a composition rate of a counter electrode and a breakdown voltage or life cycle in a capacitive device of the present invention. By varying a $Cu_2S$ composition rate in a reference electrode, measurement results are obtained for the decomposition (breakdown) voltage (shown by a curve F) and a life cycle (shown by a curve G). The life cycle is estimated by number of cycles until a breakdown takes place when the capacitive device element of FIG. 6 is repeatedly charged and discharged with terminal voltages between 0 and 600 mV and a current of 10 mA.

FIG. 10 is a graph showing a relationship between a composition rate of a counter electrode and charge storage capability, which is estimated by a charge storage time in minute with a discharge current of 30 $\mu A$ in the capacitive device with the structure of FIG. 6. By varying a $Cu_2S$ composition rate in the counter electrode, measurement results are obtained for a storage time length in minute, which length is estimated by time lengths until a terminal voltage reaches 560 mV (shown by a curve H) and 520 mV (shown by a curve I) from the time when the capacitive device element is charged by a constant voltage of 600 mV and is discharged with a discharge current of 30 $\mu A$.

With careful studies of FIG. 9 and FIG. 10, it is found that a capacitive device element with a $Cu_2S$ composition rate between 20 and 40 wt % in the counter electrode has not only a high breakdown voltage but a long life cycle. This is because the capacitive device element in accordance with the present invention can store a large amount of charges thus a polarization effect at the counter electrode is small.

Figure 11:
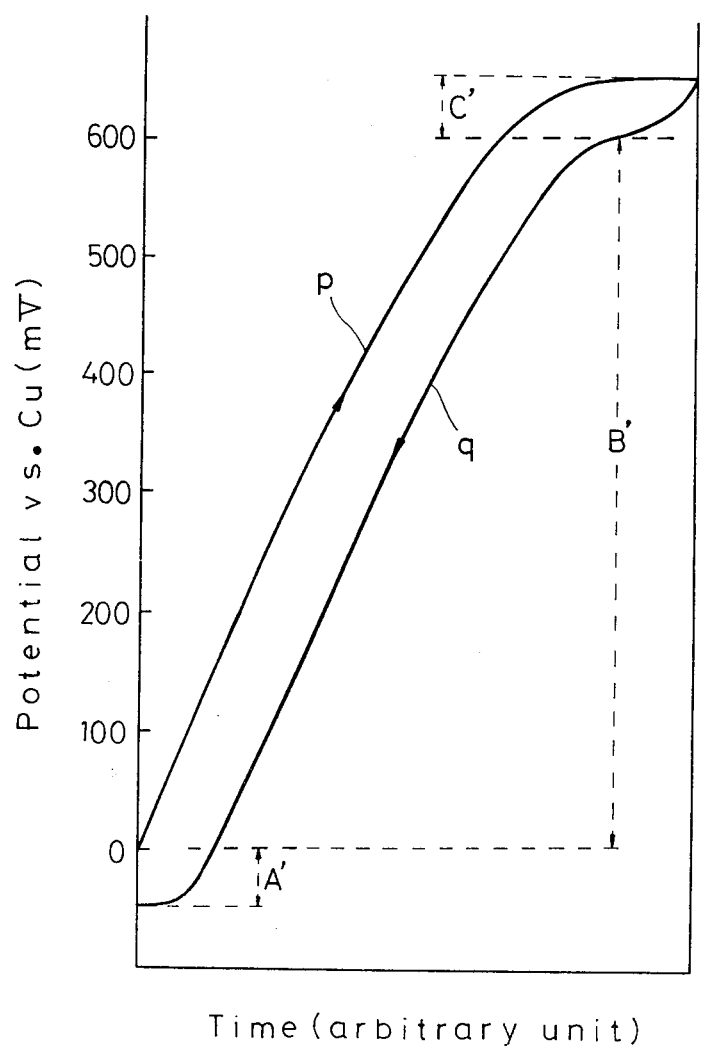
FIG. 11 is a graph showing potential variations of a polarization electrode with respect to a reference electrode of Cu in a capacitive device in accordance with the present invention.

FIG. 11 is a graph showing electrode potential variations with respect to a reference electrode of Cu in a capacitive device element in accordance with the present invention. The capacitive device element whose characteristic is shown in FIG. 11 comprises a counter electrode with a $Cu_2S$ composition rate between 20 and 40 wt % as described above, a polarization electrode comprising a solid electrolyte disclosed in the present application and active carbon with a composition rate of 10 wt %, and a reference electrode prepared by mixing the solid electrolyte and electrolytic copper powder in a ratio of 2 parts by weight of the former and 8 parts by weight of the latter. In this case, the weight of the three electrodes is equal to each other.

As an initial step, all lead terminals of the three electrodes are short-circuited for about 16 hours. After this short-circuiting for such a long time, the potential of the three electrodes becomes that of Cu (i.e. the potential of the polarization electrode becomes zero). Then a current supply is made by employing the polarization electrode as an anode with a current density of 1 $mA/cm^2$.

(c-1): The potential of the polarization electrode varies linealy until the decomposition voltage of the solid electrolyte, i.e. 600 mV as shown by a curve p in a region designated by B' of FIG. 11. When the current supply is stopped at a half way point in the region B', the potential is held there. The polarization electrode potential slightly changes upwards along the curve p due to an electrochemical reaction of oxygen absorbed in the polarization electrode (whereas the potential of the polarization electrode comprising $Cu_xS$ is well held in the region D) at the current supply termination.

(c-2): When the current is further fed, the polarization electrode potential reaches an uppermost flat region in a region C′ of the curve p. When the current supply is stopped at the flat region in the region C′, the potential of the polarization electrode decreases and becomes 600 mV.

(d-1): When the current supply is reversed at this stage, the polarization electrode potential decreases reversibly in the region B′. A reason of the hysteresis effect in the region C′ is understood that halogen gas evolved by the decomposition of the solid electrolyte is partially removed from the polarization electrode to the atmosphere. The halogen gas which remains on the polarization electrode contributes to the discharge reaction in the reverse direction on the curve q in the region C′.

(d-2): When the current is further fed to proceed the reaction of the reverse direction with a current density of 1 $mA/cm^2$, then the polarization electrode potential reaches a flat region on the curve q in a region A′. Copper is deposited in the solid electrolyte at this stage. By analyzing the measurement results, it is concluded that although the potential linearity and the charge storage capability of capacitive device comprising the polarization electrode with active carbon is inferior to the capacitive device comprising the polarization electrode with $Cu_xS$, a high breakdown voltage almost equal to the decomposition voltage is obtainable in the former capacitive device (comprising the polarization electrode with active carbon and the counter electrode with Cu).

An electrode with the active carbon is good in the charge storage capability at a high voltage range, since oxygen gas on the active carbon electrode easily discharges ($O_2$ becomes $O^-$ thus contributing to the electrochemical reaction). Therefore, one may consider one of the suitable application fields of the capacitive device of the present case in using it as a temporary current source of, for example, a memory circuit or the like electronic circuits at a power failure.

Figure 12:
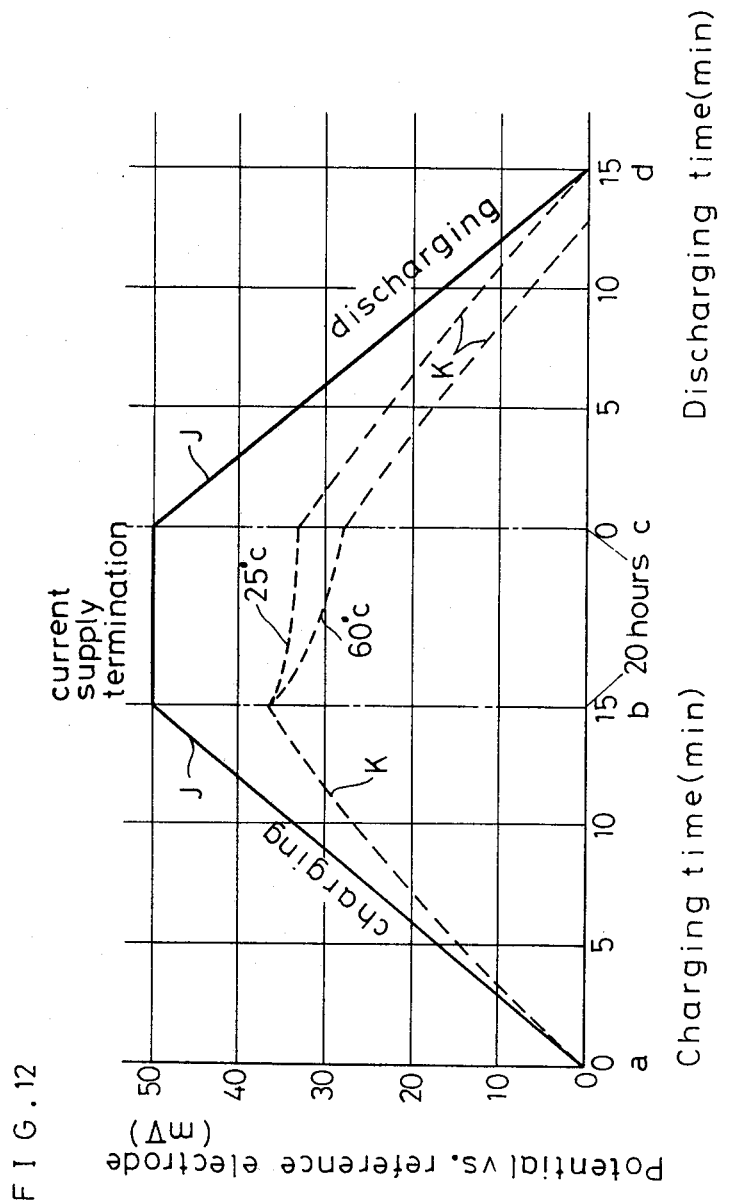
FIG. 12 is a graph showing a relationship between potential variations and charging or discharging time in capacitive devices with current collectors of Au or a stainless steel wire.

FIG. 12 is a graph showing a relationship between potential variations of a polarization electrode and charging/discharging time length in capacitive devices comprising the polarization electrode with current collectors of a Au net or stainless steel wires. The graph is made by measuring the polarization electrode potential with respect to that of a reference electrode with a constant current flow of 10 mA between the polarization electrode and a counter electrode. The variation of the potential in the charging corresponds to variation of stored charge amount, while the variation of the potential at the discharging corresponds to variation of charge storage capability. A curve J designates the characteristic of the capacitive device comprising the polarization electrode with a current collector of Au-plated metal net, whereas a curve K designates the characteristic at 25° C. and 60° C. of the capacitive device comprising the polarization electrode with a current collector of the stainless steel wires.

In the capacitive device with the current collector made of the Au net, the polarization electrode potential with respect to the reference electrode potential rises linearly to the stored charge amount, when a current flows from the polarization electrode to the counter electrode. This linear increase as shown by the curve J is observed between the times a and b of FIG. 12. When the current supply to the capacitive device is stopped at the time $b_1$ the $Cu^+$ ion movement in the solid electrolyte stops and the stored charges are preserved as shown by the curve J between times b and c during a time lapse of 20 hours.

When, in the next step, the capacitive device is discharged (i.e. a current flows from the counter electrode to the polarization electrode), the polarization electrode potential linearly decreases as shown by the curve J in the range of times c-d. Similar tendencies are obtained in the potential variation in the atmosphere above the room temperature and below 80° C.

In the case of the other capacitive device with the current collector of stainless steel wires, the polarization electrode potential varies in non-linearity as shown by the dotted curve K. The capacitive device of the curve K is therefore inferior to that of the curve J in the linearity of the potential variation. It is also confirmed that an effective capacitance of the capacitive device for the curve K is larger than that of the capacitive device for the curve J. This fact reflects that all of the applied charges are not stored in the capacitive device, but some of the charges are lost in other form than the charging. The lost charges work to cause corrosion of the current collector made of the stainless steel wire. The corrosion prevents the formation of the electric double layer at the interface between the polarization electrode and the solid electrolyte. Therefore, the potential across the lead wires of the capacitive device shows a low value and the effective capacitance derived from the potential variation is observed to be large.

In addition, a potential degeneration is observed in the capacitive device of the curve K of FIG. 12 after a stop of the current supply at the time b of FIG. 12. This means that the charge storage capability is inferior to the case of the capacitive device of the curve J. It is also confirmed that such a potential variation is larger at 60° C. than at 25° C. The charge storage capability is also affected by the corrosion effect of the current collector of the polarization electrode. The Au current collector in the capacitive device is hardly corroded, and therefore the capacitive device with the Au current collector is superior in the charge storage capability, moreover at a temperature higher than the room temperature this corrosion is little accelerated, thus the charge storage capability is hardly affected after the stop of the current supply. Accordingly, the capacitive device requires almost equal times for charging and discharging. On the contrary, the capacitive device with the stainless steel wires current collector requires different times between charging from zero to a predetermined potential and discharging from the predetermined potential to zero. This poor charge storage capability arises from the electron-related conduction in the solid electrolyte and the electrochemical reaction caused by the oxygen gas.

Figure 13:
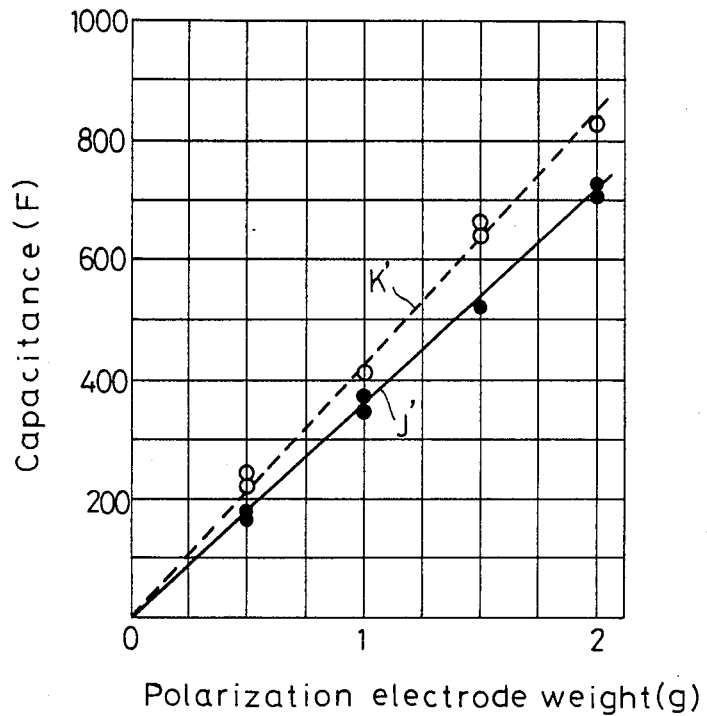
FIG. 13 is a graph showing a relationship between a capacitance of the capacitive devices of FIG. 12 and a weight of a polarization electrode.

FIG. 13 is a graph showing a relation between various values of capacitance of the capacitive devices of FIG. 12 and variations of weights of the polarization electrodes. The capacitance variations are calculated from variations of potentials of the polarization electrodes with respect to the respective reference electrode by keeping a current flow constant in the device. The capacitance variation curve designated by J′ is for the capacitive device comprising the polarization electrode with the Au current collector, while the capacitance variation curve designated by K′ is for the capacitive device comprising the polarization electrode with the stainless steel wires current collector.

As described above by referring to FIG. 12, the capacitive device of the curve K' is observed to have a capacitance higher than that of the capacitive device of the curve J' due to the corrosion of the current collector of the polarization electrode, when both polarization electrodes equally weigh. As shown in FIG. 13, the capacitance and the weight of the polarization electrode have the linear relationship represented by the lines originating from the origin. Accordingly, the capacitance of the capacitive device of the present invention can be varied by the weight control of the polarization electrode.

Figure 14:
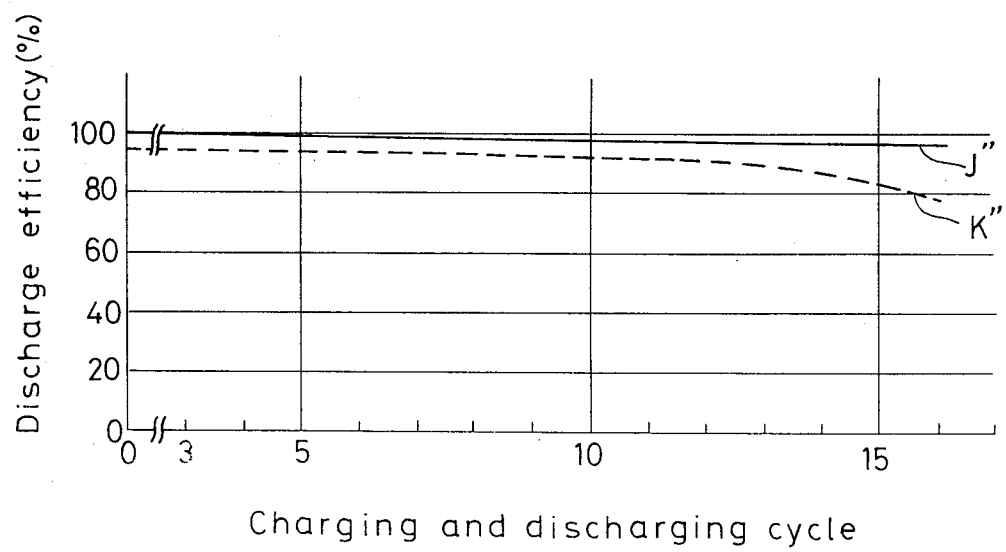
FIG. 14 is a graph showing a relationship between discharge efficiency in % and charging/discharging cycles in the capacitive devices of FIG. 12.

FIG. 14 is a graph showing a relationship between discharge efficiency in % and charging/discharging cycles in the capacitive devices elucidated referring to FIG. 12. The discharge efficiency is defined as a ratio obtained by dividing a discharging capacitance by a charging capacitance for the same voltage range. A constant current flow of 10 mA is given to the capacitive devices within an operational voltage range between 0–50 mV thereby obtaining curves designated by J'' and K''. The curve J'' is for the capacitive device comprising the polarization electrode with the Au current collector, while the curve K'' is for the capacitive device comprising the polarization electrode with the stainless steel wires current collector. The capacitive devices are charged to give rise to an output potential of 50 mV between the polarization electrode and the reference electrode, and immediately thereafter they are discharged with a discharge current of the same value up to 0 mV. The set of a charging and discharging operation is defined here as one cycle for the measurement of the curves J'' and K''. The discharge efficiency hardly becomes degraded in the capacitive device of the curve J'', while is considerably degraded in the device of the curve K''.

to 0 mV. The output potential (i.e. polarization electrode potential with respect to the reference electrode potential) varies linearly to the current flowing time. The capacitive device in accordance with the present invention can be applied for a timer means, since the charging and discharging times are controllable by varying the supplying current value.

As described above, it is possible to have a capacitive device which is superior in the charge storage capability for a long time, when Au is employed for the current collector of the polarization electrode. Such a capacitive device is also superior in the charge storage capability at a temperature higher than the room temperature, and therefore has high discharge efficiency and is usable in a wide operational temperature range. It is naturally possible and is better to employ Au than a stainless steel for the current collectors of the counter and reference electrodes. Other inert metals such as Pd and Pt provide similar effect to the case of Au.

The capacitive device in accordance with the present invention is hereafter compared with the conventional capacitive device. Comparison results are described in the following. The capacitive devices are 10 mm $\phi$ in size and 8 mm in height. The polarization electrode weighs 0.1 g and the counter and reference electrodes weigh 0.2 g, respectively. When the capacitive devices are fabricated to have the construction of FIG. 7, there is no need to form the reference electrode. The solid electrolyte weighs 0.2 g.

FIG. 16(a) to FIG. 16(e) are graphs showing potential decrease of the polarization electrodes of capacitive devices with the constitution of FIG. 3 and with solid electrolytes I, I' and III in FIG. 2. After the capacitive devices are charged at different temperatures until the polarization electrode potential reaches 70 mV with respect to the reference electrode, the potential decrease is measured against the time after the current supply termination.

TABLE 1

|  | Conventional device | Device of present invention |
|---|---|---|
| Construction (PE/SE/CE) RE | $Ag_2Se$ - /$Ag_6I_4WO_4$/Ag<br>$Ag_3PO_4$ | $Cu_xS$/$Rb_2Cu_8I_3Cl_7$/$Cu_xS$<br>$Cu_xS$ |
| Capacitance ($\mu$Ah) | 1 | 1,000 |
| (F) | 0.03 | 50 |
| voltage range (mV) | 0–120 | 0–70 |
| input current (mA) (max.) | 10 | 10 |
| operable temperature range (°C.) | −20–60 | −10–70 |
| charge storage capability | There is no distinction between these two devices. | |
| size (mm) | 10$\phi$ × 8 | 11.6$\phi$ × 6 |

Figure 15:
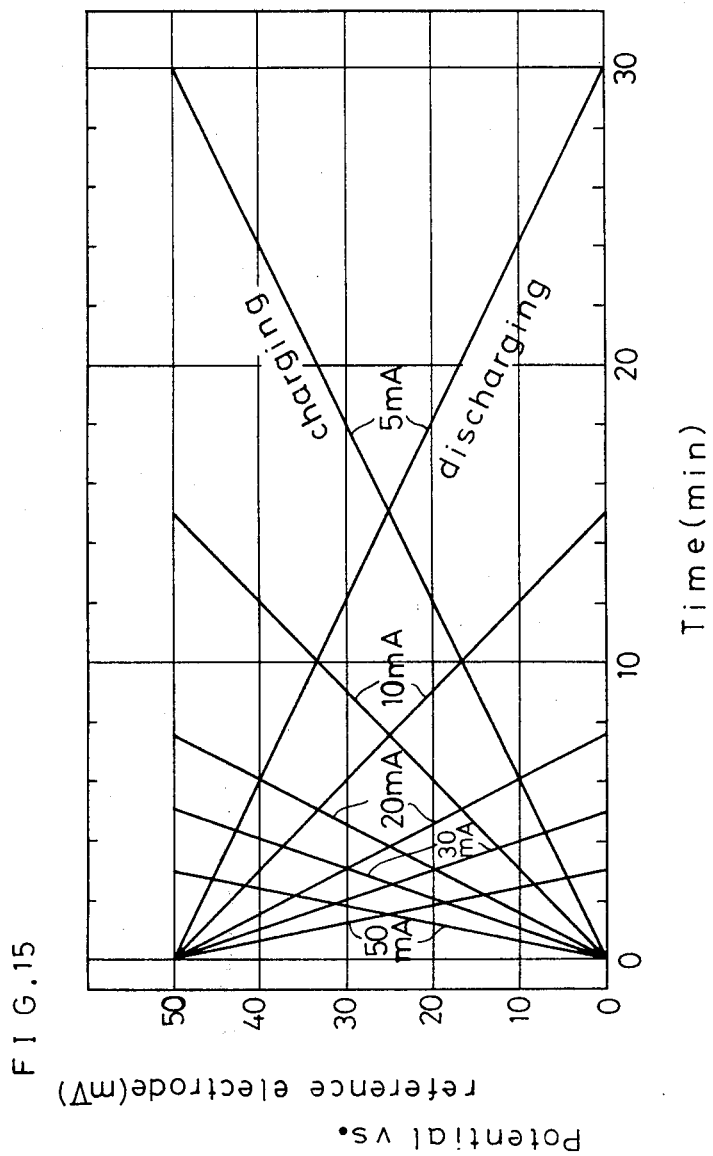
FIG. 15 is a graph showing potential variations of the polarization electrode with respect to charging and discharging current in the capacitive device of a curve J in FIG. 12.

PE: polarization electrode,
SE: solid electrolyte
CE: counter electrode,
RE: reference electrode FIG. 15 is a graph showing potential variations of the polarization electrode with respect to the reference electrode, responding to charging and discharging times in the capacitive device of the curve J in FIG. 12. Parameters of FIG. 15 is current flows of different values given to the capacitive device within an operational voltage range between 0–50 mV. Curves rising towards right (curves of positive graduation) are obtained by charging the capacitive device up to an output potential of 50 mV between the polarization electrode and the reference electrode followed by immediate discharging with the same respective current value up As already described with reference to FIG. 2, the solid electrolytes I, I' and III are $Rb_4Cu_{16}I_7Cl_{13}$, the reactant prepared from CuBr and methyltriethylenediaminebromide and $Rb_4Cu_{16}I_5Cl_{15}$, respectively. The potential decrease of the capacitive device of the present invention (with the solid electrolyte III) is extremely small in comparison with the conventional capacitive device using the solid electrolyte I', especially at a higher temperature. Since the potential decrease of the polarization electrode is caused by the electronic conduction in the solid electrolyte, the capacitive device of the present invention having the small potential decrease provides capacitive devices with a small leak current.

Table 1 is a comparison table for the capacitive devices in accordance with the present invention and the prior arts. It is known that cuprous chalcogenide has a narrow region of x values for the homogeneous phase of $Cu_xS$ in comparison with silver chalcogenide. Therefore, the capacitive device using $Cu_xS$ in accordance with the present invention has a feature of providing a high linearlity, high storage capability and a large capacitance though the potential variation range for such high performance is limited to a predetermined range.

TABLE 2

| size (mm) | | Device of present invention 12.5φ × 11.5 | Conventional device 6.3φ × 11.5 |
|---|---|---|---|
| D.C. | | | |
| breakdown voltage (V) | | 5.4 | 6.3 |
| capacitance | (F) | $1.9 \times 10^{-1}$ | $1 \times 10^{-4}$ |
| | (F/cm³) | $1.38 \times 10^{-1}$ | $0.28 \times 10^{-3}$ |
| energy (J/cm³) density | | 2.01 | $5.54 \times 10^{-3}$ |
| leak current | (μA) | 5.0 | 9.3 |
| | (A/FV) | $4.76 \times 10^{-6}$ | $1.47 \times 10^{-2}$ |
| A.C. | | | |
| capacitance (μF) | | 3.0 | 100 |
| equivalent series resistance (Ω) | | 1,980 | 3 |
| tan | | 84.5 | 0.2 |

Table 2 is a comparison table for the capacitive devices in accordance with the present invention and the prior arts. The capacitive device with the constitution of FIG. 7 (comprising nine unit cells) and an aluminum electrolytic capacitor selected from capacitors used for a timer means. Such an aluminum electrolytic capacitor is preferable for this comparison since it has a small leak current among the conventional capacitive devices.

It is seen from Table 2 that the capacitive device of the present invention is not necessarily has advantage for a use of AC circuit devices, but the capacitive device has distinctive features that it has a large capacitance, a high energy density and a low leak current value as DC circuit devices. Therefore, the capacitive device in accordance with the present invention can be applied for application fields, for example, (i) a current supply means to back up RAM (random access memory) devices, (ii) a timer means for a time constant circuit, and (iii) a power source in place of a battery for driving apparatuses which require a small amount of electric energy at one time.

In conclusion, the solid state double layer capacitor of the present invention can be produced from cheap materials in comparison with the conventional capacitive devices, while it has a small leak current, can store a large amount of charges and is superior in the charge storage capability.

What is claimed is:

1. A solid state double layer capacitor comprising:
a polarization electrode,
a counter electrode, and
a solid electrolyte disposed at least between said polarization electrode and said counter electrode,
said polarization electrode and said counter electrode comprising a mixture of cuprous sulfide and said solid electrolyte,
said solid electrolyte comprising CuCl substituted 1/5 of $Cu^+$ ions with $Rb^+$ ions and ¼ to ⅓ of $Cl^-$ ions with $I^-$ ions in CuCl.

2. A solid state double layer capacitor in accordance with claim 1 wherein said polarization electrode further comprises active carbon powder.

3. A solid state double layer capacitor in accordance with claim 1 wherein said counter electrode further comprises copper powder.

4. A solid state double layer capacitor in accordance with claim 1 wherein said polarization electrode further comprises active carbon powder and said counter electrode further comprises a mixture of cuprous sulfide and copper powder.

5. A solid state double layer capacitor in accordance with claim 1 further comprising current collectors to be in contact with said polarization electrode and said counter electrode, respectively,
said current collectors being made of an inert metal selected from the group consisting of Pt, Pd and Au.

6. A solid state double layer capacitor in accordance with claim 4 wherein said copper powder and said cuprous sulfide are mixed up in a proportion of 60-80 wt % for said copper powder and 40-20 wt % for said cuprous sulfide.

7. A solid state double layer capacitor comprising:
a polarization electrode,
a counter electrode,
a reference electrode,
a first solid electrolyte disposed at least between said polarization electrode and said counter electrode, and
a second solid electrolyte disposed between said polarization electrode and said reference electrode,
said polarization electrode, said counter electrode and said reference electrode comprising a mixture of cuprous sulfide and a third solid electrolyte selected from the group consisting of said first solid electrolyte and said second solid electrolyte,
said first solid electrolyte, said second solid electrolyte and said third solid electrolyte being solid electrolytes comprising CuCl substituted 1/5 of $Cu^+$ ions with $Rb^+$ ions and ¼ to ⅓ of $Cl^-$ ions with $I^-$ ions in CuCl.

8. A solid state double layer capacitor in accordance with claim 7 wherein said polarization electrode further comprises active carbon powder.

9. A solid state double layer capacitor in accordance with claim 7 wherein said counter electrode further comprises copper powder.

10. A solid state double layer capacitor in accordance with claim 7 wherein said polarization electrode further comprises active carbon powder and said counter electrode further comprises a mixture of cuprous sulfide and copper powder.

11. A solid state double layer capacitor in accordance with claim 7 further comprising current collectors to be in contact with said polarization electrode, said counter electrode and said reference electrode, respectively,
said current collectors being made of an inert metal selected from the group consisting of Pt, Pd and Au.

12. A solid state double layer capacitor in accordance with claim 9 wherein said copper powder and said cuprous sulfide are mixed up in a proportion of 60-80 wt % for said copper powder and 40-20 wt % for said cuprous sulfide.

13. A solid state double layer capacitor in accordance with claim 10 wherein said copper powder and said cuprous sulfide are mixed up in a proportion of 60-80 wt % for said copper powder and 40-20 wt % for said cuprous sulfide.

14. A solid state double layer capacitor in accordance with either one of claims 7, 8, 9, 10, 11, 12 or 13 wherein said reference electrode is disposed on the same side of said counter electrode with respect to said polarization electrode.

15. A solid state double layer capacitor in accordance with either one of claims 7, 8, 9, 10, 11, 12 or 13 wherein said reference electrode is disposed on the opposite side of said counter electrode with respect to said polarization electrode.

16. A solid state double layer capacitor in accordance with claim 14 wherein said first, said second and said third solid electrolytes are said solid electrolyte with same composition.

17. A solid state double layer capacitor in accordance with claim 15 wherein said first, said second and said third solid electrolytes are said solid electrolyte with same composition.

18. A solid state double layer capacitor in accordance with claim 11 wherein said copper powder and said cuprous sulfide are mixed in a proportion of 60-80 percent by weight for said copper powder and 40-20 percent by weight for said cuprous sulfide.

* * * * *